United States Patent
Miller et al.

(10) Patent No.: US 10,382,194 B1
(45) Date of Patent: Aug. 13, 2019

(54) HOMOMORPHIC ENCRYPTION BASED HIGH INTEGRITY COMPUTING SYSTEM

(71) Applicant: Rockwell Collins, Inc., Cedar Rapids, IA (US)

(72) Inventors: David A. Miller, Swisher, IA (US); Mark A. Kovalan, Cedar Rapids, IA (US); David C. Matthews, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 196 days.

(21) Appl. No.: 14/152,605

(22) Filed: Jan. 10, 2014

(51) Int. Cl.
*H04L 9/08* (2006.01)
*H04L 9/00* (2006.01)
*H04L 9/28* (2006.01)
*G06F 7/58* (2006.01)

(52) U.S. Cl.
CPC .................. *H04L 9/008* (2013.01)

(58) Field of Classification Search
CPC ....... H04L 9/008; H04L 9/0085; H04L 9/004; H04L 9/302; H04L 9/306; H04L 9/3013; H04L 9/3218
USPC ....................... 380/28, 30, 44, 237, 255, 282
See application file for complete search history.

(56) References Cited

U.S. PATENT DOCUMENTS

| | | |
|---|---|---|
| 2001/0034640 A1 | 10/2001 | Chaum |
| 2005/0259817 A1 | 11/2005 | Ramzan et al. |
| 2009/0177591 A1 | 7/2009 | Thorpe et al. |
| 2011/0026781 A1 | 2/2011 | Osadchy et al. |
| 2011/0264920 A1* | 10/2011 | Rieffel ................ H04L 9/008 713/189 |
| 2012/0215845 A1 | 8/2012 | Aad et al. |
| 2012/0254612 A1 | 10/2012 | Rane et al. |
| 2012/0297201 A1 | 11/2012 | Matsuda et al. |
| 2013/0010950 A1 | 1/2013 | Kerschbaum |
| 2013/0014270 A1 | 1/2013 | Sy et al. |
| 2013/0024693 A1 | 1/2013 | Chiou et al. |
| 2013/0085916 A1 | 4/2013 | Abbe et al. |
| 2013/0086390 A1 | 4/2013 | Kennedy et al. |
| 2013/0097417 A1 | 4/2013 | Lauter et al. |
| 2013/0097431 A1 | 4/2013 | Hriljac |
| 2013/0110876 A1 | 5/2013 | Meijer et al. |
| 2013/0111205 A1 | 5/2013 | Biswas |
| 2013/0114811 A1 | 5/2013 | Boufounos et al. |
| 2013/0120135 A1* | 5/2013 | Benson ............ G05B 13/0275 340/506 |

(Continued)

FOREIGN PATENT DOCUMENTS

WO   WO 2014/016795   *   7/2013   ............. H04L 9/008

*Primary Examiner* — Noura Zoubair
(74) *Attorney, Agent, or Firm* — Angel N. Gerdzhikov; Donna P. Suchy; Daniel M. Barbieri

(57) ABSTRACT

A homomorphic encryption based high integrity computing system including a processing system including a single-string computation channel configured to receive encrypted input data from at least one data source. The processing system includes at least one processor hosting at least one hosted function. The processor is configured to provide high integrity homomorphic encryption-based computations thereon. This enables isolated channel computations within a single physical computation channel. The at least one processor provides encrypted output data, wherein the encrypted output data is configured to enable computational integrity validation by a receiver.

8 Claims, 6 Drawing Sheets

(56) References Cited

U.S. PATENT DOCUMENTS

| | | |
|---|---|---|
| 2013/0132989 A1 | 5/2013 | Han et al. |
| 2013/0148868 A1 | 6/2013 | Troncoso et al. |
| 2013/0173917 A1 | 7/2013 | Clifton et al. |
| 2013/0191650 A1 | 7/2013 | Balakrishnan et al. |
| 2013/0275743 A1* | 10/2013 | Jawurek .................. H04L 9/008 713/150 |
| 2013/0279690 A1 | 10/2013 | Durham et al. |
| 2015/0215123 A1* | 7/2015 | Kipnis .................... H04L 9/008 380/46 |

\* cited by examiner ized application of homomorphic encryption for high computational integrity.

HOMOMORPHIC ENCRYPTION BASED HIGH INTEGRITY COMPUTING SYSTEM

BACKGROUND OF THE INVENTION

1. Field of the Invention

The present invention relates generally to high integrity processor systems and more particularly to high integrity processor systems using homomorphic encryption (HE) as an enabler for more cost-effective paradigm for high integrity computing when using a single commercial processor.

2. Description of the Related Art

Numerous applications of data transfer draw upon CRCs to protect the bit integrity of encompassed data, allowing detection of random bit errors that may occur over a communications channel, e.g., due to noise bursts. CRCs have further been applied for detection of possible data corruption by intervening single-string hardware elements, e.g., end-to-end CRC protection against potential arbitrary data corruption in avionics Ethernet switches. This concept is predicated on the hardware elements (switches) having no knowledge of the CRC polynomial, thereby precluding any failures that could result in corruption of data while persistently appending a matching CRC. Use of CRCs as a check code (which can be thought of as a transformation of the data stream) protects the data, while avoiding more costly alternatives, such as redundant (cross-compared) data flow paths used to validate bit integrity at each receiver.

While CRCs can protect the bit integrity of data passing through hardware elements, it does not readily provide computational integrity protection for data being operated upon. For example, data values A and B might be individually protected by CRCs, but a hardware element performing the addition A+B cannot be effectively monitored against corruption by an expedient such as also adding the corresponding CRCs (where the result would not provide meaningful protection or cross-checking of the sum). Hence, redundant hardware elements or computations are typically employed (with cross-comparison) to ensure data computational integrity, albeit with associated costs and complexities.

FIG. 1 (Prior Art) illustrates the standard architecture for high computational integrity computing. This standard fail-passive computation platform includes two processors and two comparator ASICs. Two fault-independent channels, cross-compare the computation performed by each processor thus insuring computational integrity of the result.

The following patent publications provide examples of homomorphic encryption:

U.S. Pat. Pub. No. US20130279690A1, entitled "PRESERVING IMAGE PRIVACY WHEN MANIPULATED BY CLOUD SERVICES," discloses a method for preserving digital photo image privacy when manipulated by cloud services. These services include resizing, cropping, filtering, etc.

U.S. Pat. Pub. No. US20130114811A, entitled "METHOD FOR PRIVACY PRESERVING HASHING OF SIGNALS WITH BINARY EMBEDDINGS," discloses a method for comparing signal waveforms while keeping each waveform confidential from the comparison processing.

U.S. Pat. Pub. No. US20110026781A1, entitled "SYSTEM FOR SECURE FACE IDENTIFICATION (SCIFI) AND METHODS USEFUL IN CONJUNCTION THEREWITH," discloses a method for privacy-retaining face identification.

U.S. Pat. Pub. No. US20090177591A1, entitled "ZERO-KNOWLEDGE PROOFS IN LARGE TRADES," discloses a method that facilitates the atomic exchange of large baskets of securities in a combinatorial exchange, while maintaining the confidentiality of the contents of each basket.

Generally, patents in this field have the form: remote user provides encrypted data to a server, the server performs some form of service on that data while maintaining the confidentiality of the data content, and the result of the computation is returned to the user encrypted using the user's public key. Thus the user is provided a service, user data confidentiality is maintained, and a service provider is enabled to offer a public service.

These patents stand in contrast to the system of the present invention of homomorphic encryption for high integrity computing as disclosed below. As will be disclosed below, the processing system of the high integrity computing system may provide the data in the open (non-encrypted) and in an encrypted form—no confidentiality is necessarily expected. Homomorphic encryption is used to insure that the computation performed by the 'server' can be validated for computational integrity at the receiver.

SUMMARY OF THE INVENTION

In a broad aspect, the present invention is embodied as a homomorphic encryption based high integrity computing system including a processing system including a single-string computation channel configured to receive encrypted input data from at least one data source. The processing system includes at least one processor hosting at least one hosted function. The processor is configured to provide high computational integrity homomorphic encryption-based computations thereon. This enables isolated channel computations within a single physical computation channel. The at least one processor provides encrypted output data, wherein the encrypted output data is configured to enable computational integrity validation by a receiver. The present invention utilizes high integrity computation on a single-string (not fail-passive) processor using 'homomorphic encryption'. 'Homomorphic encryption' as the term is defined herein, is the process of performing mathematical transactions on encrypted values without decrypting them in the process. (The key is that each encrypted value is not decrypted in the process—thus the term 'homo' meaning 'same form' is applied.) Here the term 'single-string' refers to a device that has a single fault exposure to undetected faults, consistent with use of the term in the avionics industry. 'High computational integrity' is intended to mean that there is no single fault of the processor that can produce fault-effects in the computed data that are not detected either by the transmitter processor or a receiver processor.

In one preferred embodiment, the encrypted input data comprises a plurality of triplets, each triplet comprising components A, ExA, and EyA, wherein A is a numerical value of the input data, ExA is an encrypted value of A using key x, EyA is an encrypted value of A using key y, where x and y are encryption keys.

In another broad aspect, a same set of operations are performed on respective components of the triplets. Example mathematical operations include mathematical operations selected from the group of mathematical operations comprising: addition, subtraction, multiplication, division, reciprocal, root and transcendental.

The encrypted input data is not necessarily a triplet. It may be a pair, a quad, or other N-tuple. An N-tuple representing a single numeric value A is embodied as zero or one copy of the non-encrypted value A, and n encrypted values of A, E1A, E2A, . . . , EnA, E1A is an encrypted value of A using key 1, E2A is an encrypted value of A using key 2, . . . , EnA is an encrypted value of A using key n, where keys 1, 2, . . . , and n are encryption keys.

An encryption algorithm utilized to provide said encrypted input data is selected to preclude hardware faults or implementation errors of the components of the computing system from being capable of either replicating the encryption algorithm, or producing corrupted results of encrypted values that match in a manner that defeats the computational integrity validation by a receiver. Transform functions other than encryption may be used to provide these properties.

This solution is advantageous over existing approaches. Existing high integrity computation platforms used in avionics usually embody dual processors where the computation results are compared using independent comparators. This requires multiple processors for all hosted function algorithms. This requires additional hardware, often in the form of an ASIC used to perform comparisons of the computations of the two processors. Synchronization mechanisms are also generally employed to ensure consistent data for the redundant processors. This type of computation system is quite complex as the comparisons are performed at either the clock-step level or I/O output level. Either way, the implementation and avionics certification is quite complex. Additionally, a degree of performance inefficiency is often introduced to the computational speed to help manage these complexities.

Furthermore, using existing solutions for high integrity computations in avionics, high integrity computation is restricted to take place only on designated high integrity hardware platforms.

The present invention provides high integrity computing on a single string commercial processor. This approach makes the implementation of the physical computation platform much less complicated and less costly. This solution avoids the cost, complexity, and performance issues of existing high integrity computing platforms used today in avionics systems.

For background, as an example, let A=10, and B=20, with C defined as C=A+B=30. Using an encryption approach the encrypted values of A and B are E(A) and E(B) respectively.

When a homomorphic encryption addition function ADD_HE is implemented, the encrypted value of C can be determined as E(C)=ADD_HE(E(A), E(B))=E(30). The intermediate value of 30 is never computed in the process of the function ADD_HE.

Suppose the encrypted forms of A, B, and C are E(A)=87, E(B)=53, and E(30)=91. The homomorphic encryption addition is performed as follows:

ADD_HE(E(A),E(B))=ADD_HE(87,53)=91=E(30)

This result can in turn be decrypted to produce the final open value as

Decrypt(91)=Decrypt(E(30))=30.

In addition to avionics the concepts of the present invention apply equally in many other applications. An example of interest in homomorphic encryption is in the area of cloud computing.

As will be disclosed below in detail, utilization of the principles of homomorphic encryption in the present invention minimizes the part count of a computational platform, and concomitantly improves the availability of the physical platform. It supports inter hosted function security. It provides enhanced high integrity fault isolation. It minimizes neutron single event (NSEU) upset induced processor integrity susceptibility. Furthermore, it may simplify the ability to certify the system for avionics usage.

Other objects, advantages, and novel features will become apparent from the following detailed description of the invention when considered in conjunction with the accompanying drawings.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
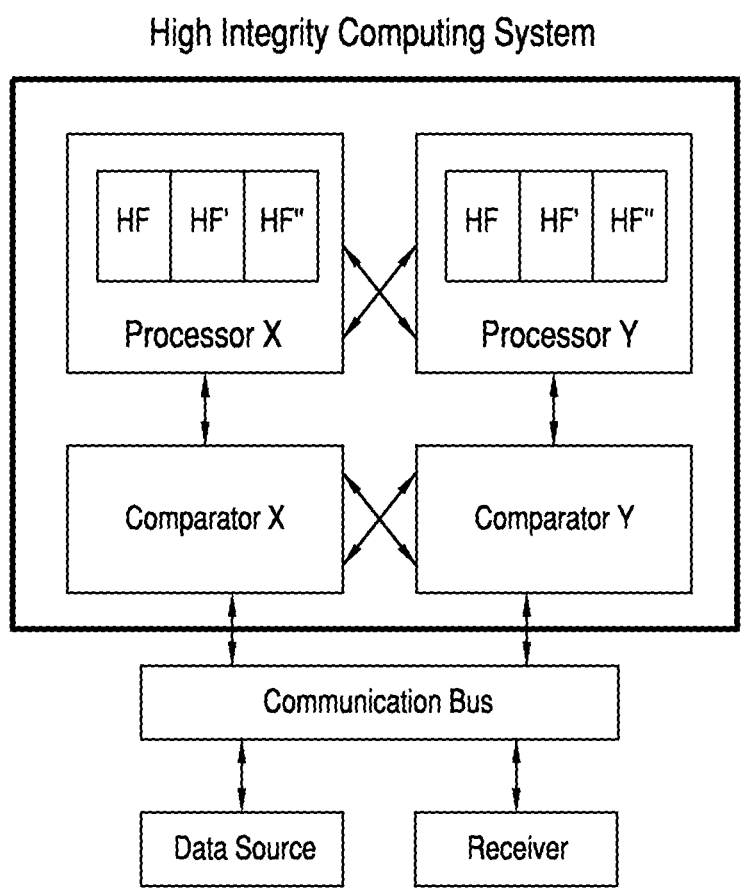
FIG. 1 (Prior Art) is a block diagram illustrating the standard architecture for high integrity computing with a standard fail-passive computation platform.
Figure 2:
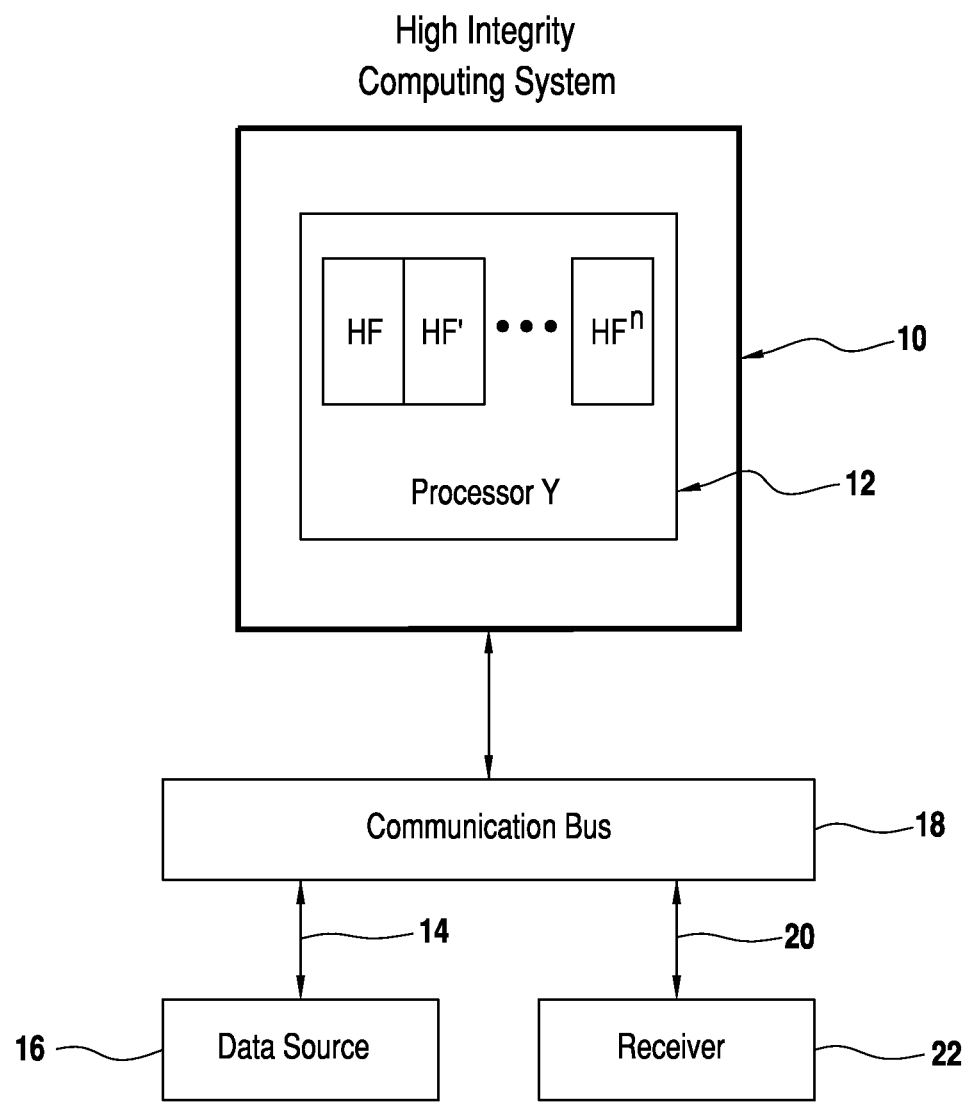
FIG. 2 is a block diagram of the homomorphic encryption based high integrity computing system of the present invention, as implemented with a single processor.

Referring now to the drawings and the characters of reference marked thereon, FIG. 2 illustrates the homomorphic encryption based high integrity computing system of the present invention, designated generally as 10. The homomorphic encryption based high integrity computing system 10 includes a processing system 12 including a single-string computation channel configured to receive encrypted input data 14 from at least one data source 16, via a communication bus 18. The processing system 12 includes a processor (Processor Y, as shown in FIG. 2) for hosting hosted functions HF, HF', . . . HF". The processor is configured to provide high integrity homomorphic encryption-based computations thereon, thus enabling isolated channel computations. The processor provides encrypted output data 20. The encrypted output data 20 is configured to enable computational integrity validation by a receiver 22. Thus, even with the utilization of only one processor, a high integrity computing system can be realized. The hosted functions may be any number of functions needed for computations, for example, in avionics applications these functions may include display applications, flight management applications, and autopilot applications. Other applications may include, for example, Windows Explorer.

The present invention can use any suitable processor, such as commercial processors utilized in laptops and personal computers. It does not require specialized processors. Similarly, the communication bus may be of a simple commercial type, or for example, buses typically used in avionics. The data source can be any typical data source in which high computational integrity manipulation is desired, such as, for example, air speed sensors, barometric sensors, door latch sensors, fire sensors, and the output of more sophisticated devices such as control panels, etc. Similarly, the receiver may be any type of device in which it is desired to validate the computational integrity performed by the high integrity computing system.

High integrity computing: Some avionics architectures benefit from computation platforms that are able to provide high integrity computing (fail-passive—no single fault exposure, and low probabilities of undetected fault effects). High integrity computing is supported today using relatively complex and costly computing platforms. The use of homomorphic encryption technology enables high integrity computing on much simpler computing platforms. This makes the computation platforms of the system less complicated and less expensive.

Figure 3:
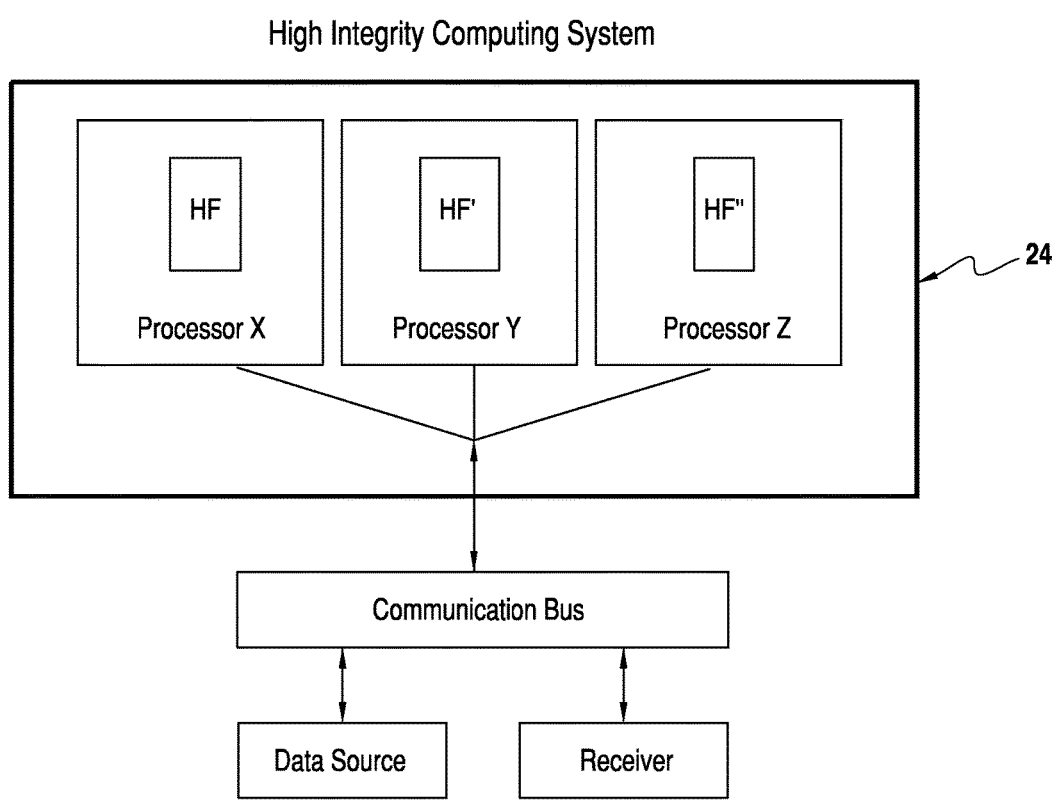
FIG. 3 is a block diagram of the homomorphic encryption based high integrity computing system of the present invention, as implemented with three processors, still maintaining a single-string computation channel.

Referring now to FIG. 3, a homomorphic encryption based high integrity computing system of the present invention, as implemented with three processors (Processors X, Y, and Z) is illustrated, designated generally as 24. As in the first embodiment, the system 24 still maintains a single-string computation channel, that is, a fault in any of the three processors may compromise the computation of the others. The computation channel is implemented as a single channel in hardware. In this case the three processors are used for computational capacity performance rather than a single processor.

Figure 4:
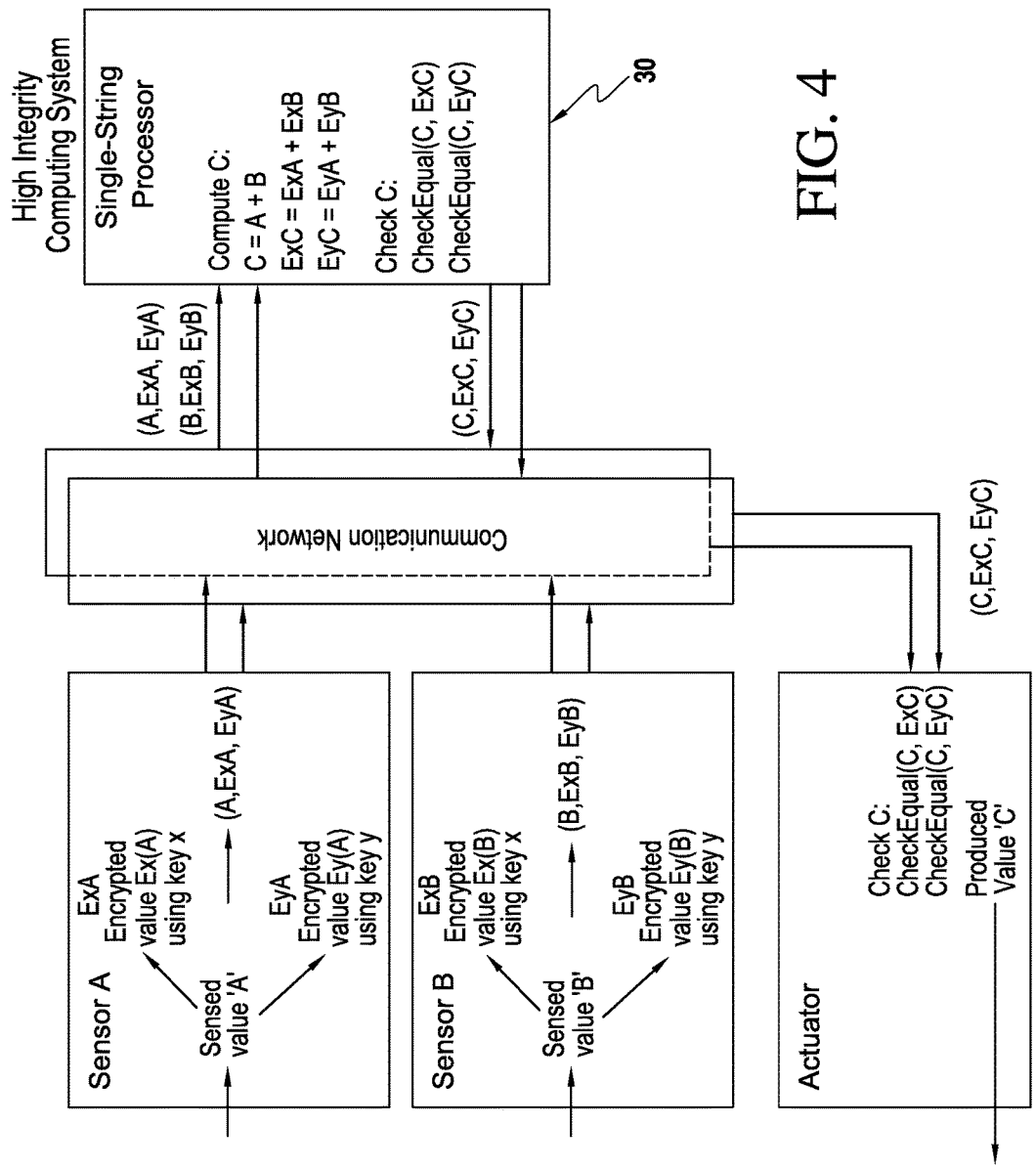
FIG. 4 is a block diagram illustrating an example of the utilization of the homomorphic encryption based high integrity computing system in a simplified avionics architecture.

Referring now to FIG. 4, utilization of the homomorphic encryption based high integrity computing system in a simplified avionics architecture, is illustrated, designated generally as 30. In system 30 the data sources are from Sensors A and B. The sensors pass each data value as a triplet. The triplet from Sensor A comprises components A, ExA, and EyA, wherein A is a numerical value of the input data, ExA is an encrypted value of A using key x, EyA is an encrypted value of A using key y, where x and y are encryption keys. Similarly, Sensor B provides encrypted input data comprising a triplet having components B, ExB, and EyB.

The encrypted input data triplets are passed to the system 30 via the communication network. This single string high integrity computation platform computes the triplet C=A+B, where C includes a triplet having components C, ExC, EyC. The Actuator validates the computational integrity of C before making use of the data by checking to insure that Ex(C)=ExC and Ey(C)=EyC.

Thus, the two sensors A and B collect sensor data which is provided to the system 30. Sensors A and B each have encryption keys used to encrypt sensor data. These keys may be unique to each sensor. Each sensor collects sensor data, computes the encrypted values using key x and key y, and transmits a triple (sensor data, encrypted (sensor data, key x), and encrypted (sensor data, key y)).

This triple is distributed to other components of the system using the communication network. The communication network may be implemented, for example, as a combination of field busses and AFDX Ethernet networking.

The single-string processor (e.g., normal commercial processor) accepts the triple from Sensor A and Sensor B. The processor supports a hosted function that computes a simple algorithm 'C=A+B'. The hosted function computes C=A+B, but also uses homomorphic encryption to compute 'ExC=ExA+ExB', and 'EyC=EyA+EyB'. Before transmitting the triple representing the value of C, the parameter C may be compared to ExC and EyC to insure they both represent the same computed value, and is notionally sketched in that manner below. However, depending on the required computational integrity and nature of the transformed (encrypted) data, it may be better to perform the comparison (and associated transformation) function externally by the downstream users.

The triple representing the value C is received at the actuator. The parameter C is compared to ExC and EyC to insure they both represent the same computed value. Assuming they positively compare the value C is used to set the state of the actuator.

In the case of a processor fault causing an invalid C value, C=ExC and C=EyC will only occur after very low probability statistically independent events have occurred. These three events are 1) a processor physical fault in 30 (for example the addition function is faulted) causing an invalid value of C, 2) ExC=C (rather than Ex(A+B)), and 3) EyC=C (rather than Ey(A+B)). Thus an undetected computation error resulting from a platform fault requires a physical processor fault and two additional statistically independent events to occur, with each having very low probability of occurrence.

Furthermore, these fault-effects in the computed values are detectable at the source computing processor or at the destination device or both.

Homomorphic Encryption Key Management

In order to support homomorphic encryption as a tool within avionic systems, key management needs to be addressed. The main issue with key management is that the private keys must be unknown to the device performing homomorphic encryption. For example, when a processor supports a homomorphic encryption addition function on the parameters A and B, the key used to decrypt A and B must be unknown to the processor. Therefore, when sensors A and B each provide data values to a processor, the two sensors could share an encryption key, or each have their own. One solution is to have a single public key used to encrypt individual data values to be used under homomorphic encryption, and to not have the private corresponding key located anywhere in the aircraft.

It may be necessary to additionally maintain the privacy of the public key used to encrypt the data at the sensor source, from the computation platforms performing homomorphic encryption. The specific concern is that a computation platform fault would result in modification of the original value A (for example), and encryption of the value A using the public key(s) to produce a homomorphic encryption triple used in the computation. This would clearly allow a single-string computation platform to modify parameter data undetected. The issue of uniqueness of keys may depend on the nature of the homomorphic encryption tool implementation. For example, can two values be 'Added' which are each encrypted using different keys.

Single Processor Fail-Passivity

With respect to single processor fail-passivity the goal is that no single processor fault can compromise the ability to detect invalid computations either at the transmitter or the receiver. This provides fail-passive computation (no single fault exposure) with a very low probability of undetected errors. In support of this discussion let c=A+B, $c_x$=$Add_x(A_x, B_x)$, $c_y$=$Add_y(A_y, B_y)$ where $A_x$ and $A_y$ are the encrypted values of A using keys x and y respectively, $B_x$ and $B_y$ are the encrypted values of B using keys x and y respectively, and $Add_x$ and $Add_y$ are homomorphic encryption addition functions capable of preforming addition on encrypted numerical values.

When one or more of c, $c_y$, or $c_x$ are computed incorrectly (with a false value), detection occurs when either c # $c_y$ or c # $c_x$.

On the other hand no detection occurs when c=$c_y$ and c=$c_x$. In this case c, $c_y$, and $c_x$ must each be computed to represent the same false value in order to have an undetected fault-effect.

Let event $E_x$ ($E_y$) be defined as c=$c_x$ (c=$c_y$) respectively.

By definition of statistical independence the following relations hold:

$$P(E_x \text{ and } E_y) = P(E_x) \cdot P(E_y) \overset{IFF}{\Leftrightarrow} P(E_x | E_y) = P(E_x)$$

$$P(E_x \text{ and } E_y) = P(E_x) \cdot P(E_y) \overset{IFF}{\Leftrightarrow} P(E_y | E_x) = P(E_y)$$

Therefore we know $E_x$ and $E_y$ are statistically independent when either: $P(E_x|E_y)=P(E_x)$ or $P(E_y|E_x)=P(E_y)$.

Here we show that $P(E_x|E_y)=P(E_x)$. We assume a processor fault so that at least one of c, $c_x$, or $c_y$ is computed incorrectly. The table below shows the permutations of correct and incorrect computations of c, $c_x$, or $c_y$, and whether the incorrect computation can be detected.

We know that $c \overset{mapping}{\leftrightarrow} c_x$ is a cryptographically pseudo random permutation when compared to $c \overset{mapping}{\leftrightarrow} c_y$, as each of the encryption forms X and Y are unique, and use relatively irreducible key parameters. The exact meaning irreducibility will depend on the type of encryption used.

If all values of $c_x$ have equal probability given an incorrect computed value (i.e. $c_x \neq Add_x(A,B)$), then the probability $P(E_x) = P(c=c_x)$ is equal to 1/value space of $c_x$. When the encryption key is 32 bits this would be $2^{-32}$.

The event $E_y=(c=c_y)$ makes $E_x$ no more probable, as $E_x$ is true as the result of collision between c and $c_x$ occurring under a cryptographically pseudo random permutation when c has an incorrect value.

Therefore, $P(E_x|E_y)=P(E_x)$ which implies $P(E_x \text{ and } E_y)=P(E_x) \cdot P(E_y)$. From this we know that $E_x$ and $E_y$ are statistically independent events.

This means that a three event sequence, with each event being statistically independent and low probability must occur in order for a fault-effect in the computation of the value c to go undetected. These three faults are:

1) the processor physically faults affecting the ability to compute c, and
2) at a pseudo random probability an alternate value of $c_x$ is computed so that c=$c_x$, and

| Case | Number Incorrect | c | $c_x$ | $c_y$ | $E_x$ | $E_y$ | Detected |
|---|---|---|---|---|---|---|---|
| 1 | 1 | Incorrect | Correct | Correct | False | False | True (1) |
| 2 | 1 | Correct | Incorrect | Correct | False | True | True (1) |
| 3 | 1 | Correct | Correct | Incorrect | True | False | True (1) |
| 4 | 2 | Incorrect | Incorrect | Correct | True or False | False | True (1) |
| 5 | 2 | Incorrect | Correct | Incorrect | False | True or False | True (1) |
| 6 | 2 | Correct | Incorrect | Incorrect | False | False | True (1) |
| 7 | 3 | Incorrect | Incorrect | Incorrect | True or False | True or False | Undetected at the probability of collision |

Note 1: The miscompare will be detected because the Equal check is performed by the receiver. Therefore, both processors would need to fail for the fault-effect to remain undetected.

In cases 1 to 6 detection is possible as at least one of the three has the correct value and at least one of the other two has another value (incorrect). Thus the Equal function will return false when comparing the correct value with an incorrect value.

In case 7 all three have an incorrect value. The value of c, $c_x$, and $c_y$ do not necessarily represent the same value, although each are incorrect. Therefore $E_x$ and $E_y$ can either be true or false. When $E_x$ and $E_y$ are statistically independent, case 7 having a false detection for both $E_x$ and $E_y$ represents a two event sequence with the events being statistically independent, and where each event has a low probability.

In case 7 for $c_x$ and $c_y$ all encrypted values have an equal probability of being selected when the computed underlying value (which is then encrypted) is incorrect.

The encryption used for forms X and Y have the property that $c \overset{mapping}{\leftrightarrow} \text{Encrypt}(c)$, is a cryptographically pseudo random permutation. When the value being encrypted is modified, the resulting encrypted value is selected from a pseudo random permutation, so that all values are in general equally probable.

The permutation provided by encryption X and Y will be unique as the underlying encryption keys are unique.

3) at a pseudo random probability an alternate value of $c_y$ is computed so that c=$c_y$.

Assuming the failure rate of the processor is $10^{-5}$ per hour the probability of a processor fault affecting the computation logic is assumed to be P(processor fault)=$10^{-6}$ per hour where 10% of the failures induce a computational logic fault.

32-Bit Encryption

Assuming a 32-bit encryption scheme is used having a pseudo random permutation for encryption forms X and Y, and assuming Q homomorphic encryption computations per hour, the probability of both encryptions failing per hour is computed as $P(E_x \text{ and } E_y)=(Q \cdot 2^{-32})^2 = Q^2 \cdot 2^{-64} = Q^2/10^{19.3}$ per hour.

The probability of all three statistically independent events occurring per hour per processor is:

$$P(E_x \text{ and } E_y) \cdot P(\text{processor fault}) = Q^2/10^{19.3} 10^{-6} = Q^2/10^{25.3}.$$

With the goal of $P(E_x \text{ and } E_y) \cdot P(\text{processor fault})=Q^2/10^{-9}$, per hour Q can be computed as follows:

$$P(E_x \text{ and } E_y) \cdot P(\text{processor fault})=10^{-9}=Q^2/10^{19.3} \cdot 10^{-6}=Q^2/10^{25.3}$$

$$10^{-9}=Q^2/10^{25.3}$$

$$Q2=10^{25.3}/10^9=10^{(25.3-9)}=10^{16.3}=10^{2 \cdot 8.1}$$

$$Q=10^{8.1} \cong 100 \text{ Million}$$

The computations per ms allowed, given 3.6·10⁶ ms per hour, is computed as 37.7=

$$37.7 = \frac{10^{8.1}}{3.6 \cdot 10^6}.$$

Thus, using an encryption size of 32-bits, 37 computations per ms would be provisioned. This is not a significant amount of computations per ms.

The table below shows the results of this computation performed using encryption key sizes of 32, 40, 48, and 64 bits.

| Encryption Bit Size | 32-bit | 40-bit | 48-bit | 64-bit |
|---|---|---|---|---|
| Computations per ms | 37.7 | 9,658 | 2.47 Million | 1.62 × 10¹¹ |
| Computations per us | — | 9.6 | 2,473 | 162 Million |
| Computations per nano-sec (1 clock at 1 GHz) | — | — | 2.5 | 162 Thousand |

From this table we can see that 32-bit sized encryption keys are not sufficient, 40-bit sized encryption keys are probably sufficient, and 48-bit is clearly sufficient.

This evaluation is conservative as it assumes full rate computation of arithmetic functions (only math operations are supported). Typically much processor time is spent in low computational integrity operations.

The effect of multiple arithmetic transactions per final computational result, and the detectability of physical computation faults which will limit the exposure time can all be considered. This follows as most avionics computations involve more than a single mathematical operation as was used in the example here.

Figure 5:
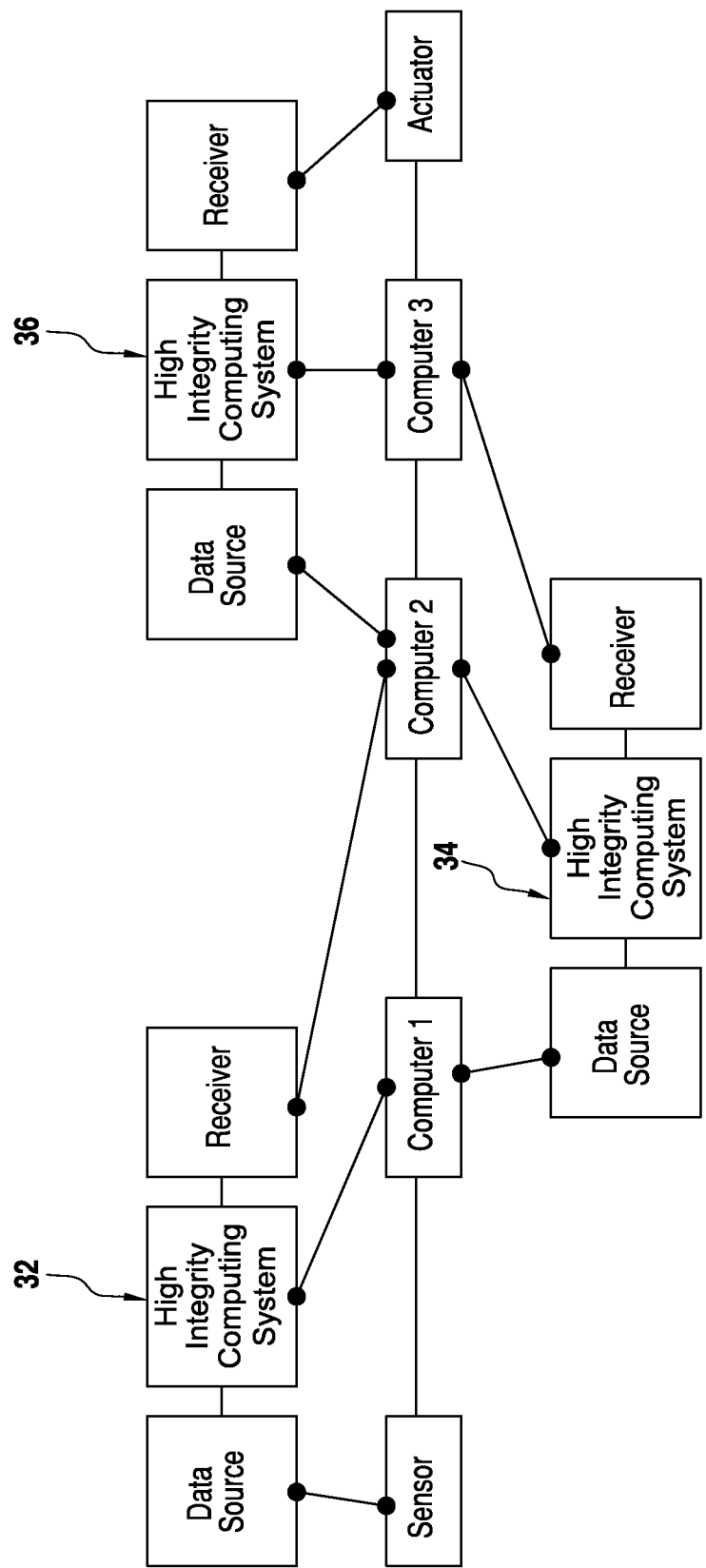
FIG. 5 is an example of the utilization of a plurality of the homomorphic encryption based high integrity computing systems to implement an avionics system, showing a single control path.

Referring now to FIG. 5, an example of the utilization of a plurality of the homomorphic encryption based high integrity computing systems 32, 34, 36 to implement an avionics system, showing a single control path, is illustrated. This control path (also referred to as a data path) is as follows: from Sensor, to Computer 1, to Computer 2, to Computer 3, and to Actuator. The Sensor is a data source.

Computer 1 is a high integrity computing system, and a data source for computer 2. Computer 2 is a high integrity computing system, a data source for computer 3, and a receiver for computer 1. Computer 3 is a high integrity computing system, and a receiver for computer 2. Actuator is a receiver. As this figure schematically illustrates, the present invention operates along a single control path.

Figure 6:
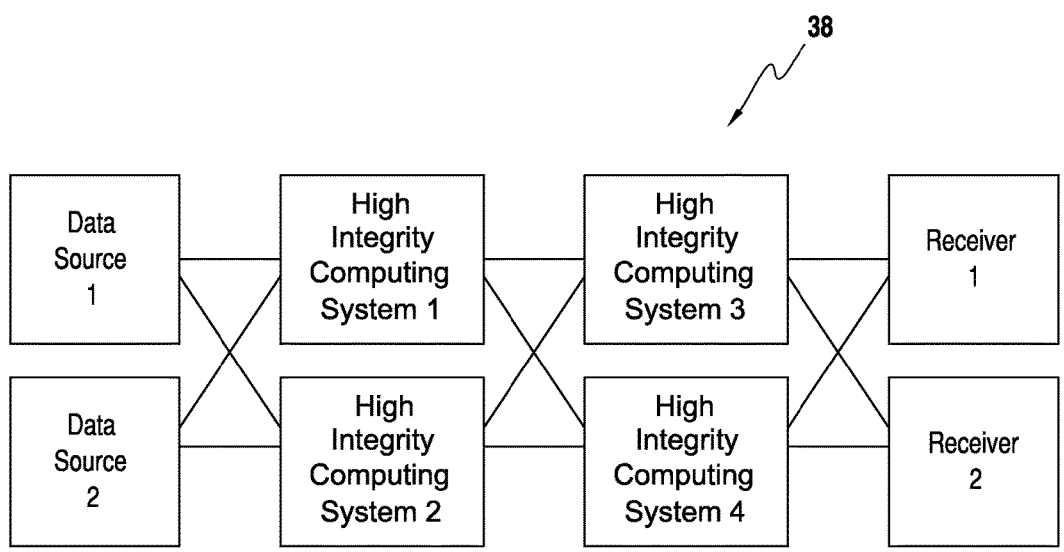
FIG. 6 shows the multiple control paths in an avionics architecture having multiple interconnected data sources, computing platforms and receivers.

FIG. 6 shows the multiple control paths in an avionics architecture, designated generally as 38, having multiple interconnected data sources, computing platforms and receivers. This illustrates how the inventive concepts herein are applicable to create the building blocks for a complex avionics architecture.

Computational Platform Complexity

The use of homomorphic encryption reduces the design complexity of the computational platform. This follows as internal comparators needed using a standard fail-passive approach are not needed. Instead, the host processor, and IO node are simply single-string and do not require visibility to support functional comparison points. This makes their design approach much simpler, and may improve the performance, as no need for inter-channel synching exists.

Computational Platform Availability

When the use of homomorphic encryption reduces the part count of a computational platform, the availability of the physical platform will improve. This simply results from having fewer parts supporting the same function. Note that for some applications, a function may not be entirely eliminated, but rather included within another existing functional element. For example, in the table below, the "comparator" function might reside in a downstream user of the data, where the transformation algorithm is to be kept unknown by the computation of that data.

| Standard Fail-Passive Computation | Homomorphic Encryption Based Computation |
|---|---|
| Part count: 6 = 2 × processor + 2 × comparator ASIC + 2 IO Nodes | Part count: 2 = 1 × processor + 1 × IO Node |

Inter Hosted Function Security

There is a need in some platforms to host multiple hosted functions, but to limit the access to received and computed data. This insures another hosted function may not sense the receive data stream or computed data stream and glean information that should remain secret.

Homomorphic encryption, utilizing the teachings of the present invention, may support inter hosted function security. When the receive data content and the transmitted computed data content is encrypted, the hosted function can utilize homomorphic encryption to compute the required values. A second hosted function will be unable to determine the values of the receive or transmitted data content, other than the existence of the data.

This is similar to the example provided earlier where a function is supported in the internet cloud, and the data content security is preserved. This may simplify platform mechanisms needed to insure security, and the certification argument needed to justify the security claims.

The general concept of including a form of data check code or transformation is extended by the principles of the present invention, thereby allowing protection of data being operated upon by, as well as passed through, intervening hardware elements. Data presented to such elements is first supplied to one or more transformation algorithms. The data and a transform (or as a variation, multiple transforms of the data) are then presented to hardware elements for subsequent operations/computations to occur. The transformation algorithm(s) chosen have properties allowing operations to be performed on the transformed data, where the results are a meaningful representation of the transformed result obtained from a corresponding operation on the original data. Downstream users of the computations, with knowledge of the transformation (or inverse) algorithm(s), can then cross-check the redundantly computed data (data and transform, or two transforms), for computational integrity. Note that this is analogous to the case of CRC protection of data as described above, except the nature of the transform(s) differs from CRCs in that meaningful yet diverse data operations/computations can be performed.

This approach is most effectively applied where the hardware elements have no knowledge of the transformation algorithm, thereby precluding malicious corruption of data and generating a matching transformation. Furthermore, the transformation(s) must result in a sufficiently diverse representation that a fault or implementation error in the intervening hardware elements cannot inadvertently result in corruption of both the operations on the data itself and the transform of that data. This is analogous to the underlying assumption that a hardware fault cannot cause corruption of a data stream and its CRC, given that the hardware element has no knowledge of the CRC polynomial. The second (diversity) criterion may be more difficult to assert for performing arbitrary computations on data, but may be simpler where specific fixed operations are to occur.

The present invention allows a single computing resource to provide "redundant" arbitrary computations for computational integrity, i.e., a processor performing operations on data and transformed data with a down-stream cross-check. This assumes a sufficiently diverse transformation. The present inventive concepts may include modest applications with less stringent transformation requirements than encryption. These might include instances of limited, fixed operations, or redundant computations performed on a multi-core processor, with protection afforded to shared hardware resources interfacing with the multiple CPU cores.

Numerous variations of this technique are possible. For example, the transformation may result in unique values, or non-unique but resolvable within a useful accuracy or probability to satisfy the system requirements.

In addition to avionics the concepts of the present invention apply equally in many other applications. An example of interest in homomorphic encryption is in the area of cloud computing. Here is a typical example. Suppose a small businessman needs to produce a balance sheet. He has all the individual values needed to compute the balance sheet, but does not want to spend the time to make the balance sheet himself and does not want to purchase software on his personal computer to do so.

Instead a service provider in the cloud (cloud computing) offers an algorithm to make a balance sheet. In order to overcome concerns about confidentially of the data content of the balance sheet encryption is used to secure each individual data item. That is, each value is encrypted individually.

So, the businessman encrypts each individual value using his public encryption key, and sends the list of encrypted values to the service provider in the cloud. Using homomorphic encryption the service providers computes the balance sheet. The original individual values are never disclosed, even as an intermediate parameter value in the process as they are each encrypted. The completed balance sheet has all data value items expressed as encrypted values (again encrypted using the businessman's public key). This completed balance sheet is sent to the businessman. Upon receipt the businessman uses a tool to decrypt each individual value (using his private encryption key) of the balance sheet to produce the final readable balance sheet. In this way the businessman is able to have a completed balance sheet, the cloud service provider is able to provide a desired service, and all data is kept confidential in the process. Thus, homomorphic encryption technology of the present invention is also an enabler for implementations of commercial services provided offsite from the user. It may enable remote high integrity computing. For example, in this businessman example, the remote computation of the balance sheet may be computed using triplets and the businessman would validate the correctness of each triplet upon receipt of the balance sheet. This provides for both confidentiality and validation of computational integrity.

The present inventive concepts can utilize various encryption types, including but not limited to RSA, updated RSA, ElGamal, Goldwasser-Micali, Benaloh, Paillier), the algorithm used to perform mathematical operations (addition, multiplication, . . . ), and the protocols used to exchange homomorphic encrypted numerical data content.

The inventive concepts presented herein provide additional benefits (beyond the simplification of existing fail-passive computing platforms) of homomorphic encryption to avionics systems.

Error Detection

The use of homomorphic encryption in processing may aid in high integrity fault isolation. In transmission, the computed values are homomorphically validated to insure they represent different forms of the same underlying computed value. When this is not the case the processor can declare this to a health management system, and not transmit the corrupted data. This detection process is single-string as the single-string processor is performing the validation.

In reception, the computed values are homomorphically validated to insure they represent different forms of the same underlying computed value. When this is not the case the receiving processor can discard the corrupted data, and report the corrupted computed values to HM. Notice, that when the data transmitted form the source computation platform is CRC covered for bit errors, the corruption must have occurred as a result of faulted computational logic in the source. This provides excellent isolation of computationally faulted computation processors.

NSEU Susceptibility

In avionics the issue of NSEU susceptibility in the computational processors is a difficult issue to determine in a commercial processor. This is because each commercial processor is often presented as a black box to users. The impact of neutron upsets on the function, detected and undetected, of the processor is often very difficult to assess.

When using homomorphic encryption the issue of NSEU induced processor integrity susceptibility is reduced. This follows as any NSEU impact to the function of the processor can be detected at a very high probability when the fault state affects the computational function. The impacts of NSEU on computation are either 1) transient or 2) permanent requiring a reset. When a purely transient event occurs which compromises computational integrity a computed value can simply be discarded at the transmission processor or the receiver processor.

The availability of a processor remains an issue influenced by NSEU events. However, the availability of a processor is often more straightforward to assess. This follows as the loss of function of a processor is often more directly driven by the quantity of exposed memory cells existing in the part.

I/O Offload Engines

An important issue in avionics architectures is the mechanism used to support I/O management. When data arrives to an avionics computing platform, the arriving data must be parsed and placed at locations in preparation for the computational algorithms to access them. Generally processors are more cost effectively applied to the task of software based computation. On the other hand 10 parts exist which are specifically designed to manage I/O. The I/O devices are generally not well suited for avionics computation, but are less expensive and better able to perform the I/O data receive process. The design approach for the implementation of I/O engines is an important consideration in the design of avionics computation platforms.

An important issue relating to I/O management is the potential of the I/O device to modify data that passes through it. This is an important certification issue. When it is possible that a single fault in the I/O management device may allow the device to modify data, the data integrity of received data is vulnerable. Consider for example if a display receives data from ten computed and sensor sources. When a single-string I/O data management device is used (capable of single fault to compromise data integrity) then potentially all received data may be modified.

This issue is addressed today by using a CRC wrapping technique. This works, but it comes at a cost. First, the degree of data de-aggregation (parsing) that can be performed by the I/O management device is limited to the scope of data covered by the CRC wrappers. Ideally, the I/O device would parse the received data, and provide the contents to the hosted function in a granulated form, thus reducing the amount of data parsing needed at the processor. Second, the host processor must perform the CRC validation on the received I/O data again to validate its bit integrity. For this reason the I/O device is made fail-passive (no single-string potential fault) when the host processor is made fail-passive.

When using the homomorphic encryption techniques of the present invention, a single string I/O device parses data content out to the host processor without compromising bit integrity of the data, and without requiring the host processor to revalidate the data contents using a CRC wrapper. This makes computational platform design much more flexible.

Multicore CORE Isolation

A general concern in the use of multicore is the need to isolate the faults of a given CORE so that other COREs remain unaffected. This is especially problematic when considering high integrity computing. However, when a CORE is supporting a hosted function using homomorphic encryption, there is no need to claim strong isolation of the COREs.

Suppose a CORE 1 uses homomorphic encryption to compute C=A+B. There are two cases of the resulting values for 'c': 1) they can be validated to insure they represent the same underlying value, or 2) they don't. Considering the case 1) where they are validated to represent the same numeric value, this is either the correct value (i.e. A+B) or not. When it is the correct value it really does not matter whether or not the computed value of 'c' resulted from a combination of CORE 1 and another faulted CORE or not (after all the value is correct!). When it is not the correct value, the incorrect value can be detected with high probabilities. In this case it makes no difference if the fault-effect was the result of CORE 1 fault or a because of another fault in the processor (including other COREs) that had an influence on CORE 1. So from an integrity point of view, other CORE faults do not compromise the undetected error rates. Therefore, there is no need to claim strong computational isolation between the cores of a multicore processor when considering an algorithm implemented using homomorphic encryption.

A variation may exist where difficulty is encountered in asserting sufficient diversity of a transformation function (e.g., homomorphic encryption) with respect to required integrity for arbitrary computations. The technique may still be useful if the arbitrary, complex computations on the data itself and the transformed (encrypted) data are performed on separate cores, and the diversity of the transformation is shown adequate to provide integrity protection for the shared resources, e.g., internal buses, cache memories, etc.

Feasible Multi-Core High Integrity Computing

Future high integrity fail-passive computation platforms may utilize multi-core processors. This follows as processor designs are migrating to multi-core from single-core designs, and because of the need for the quantity of computation multi-core processors can offer.

Existing high-integrity fail-passive computation platforms use a pair of commercial single-core processors using a pair of comparator ASICs to validate common computation. This insures that any deviation from expected fault-free behavior, a fault, must be consistent between two computation processors, or two monitoring ASICs for the deviation to remain undetected.

This migration from single-core to multi-core processors complicates the high integrity computation platform design approach when using a lock-step strategy. When using single-core processors the single-core of each processor of the processor pair is monitored in lock-step, which has proven to be a very complicated design and certification challenge. This insures common computation results between the two single-core processors. When using multi-core processors the corresponding core of each multi-core processor of the processor pair must be monitored in lock-step in order to provide high-integrity fail-passive computation using multi-core lock-stepping. The design and certification challenge relating to high-integrity computing using lock-step multi-core processors may prove to be extremely challenging. Lock step mechanisms have been proposed at the clock and IO level. Both of these strategies seem extremely difficult when the clock level signal or IO output may have originated from any of the cores of the multicore processor.

Some commercial multi-core processor designs enable a degree of lock-step monitoring of a processor pair. These mechanisms may not satisfy the certification requirements as the visibility to the internal monitoring mechanisms may be in question, which compromises integrity certification and may compromise availability if the mechanisms cannot be characterized for false positives. Additionally lock-step enabled multi-core processors have a lower processor computation capacity by a factor of 5 to 10.

These concerns raise a red flag for the application of the single-core high-integrity computation design paradigm to commercial multi-core processors. On the other hand, the application of HE to high-integrity computation avoids the issues of lock-step monitoring. This makes HE a tractable design trade against existing design approaches.

Scope of Use within Avionics

The present invention reduces the scope of avionics data parameters that needs to be covered by the use of homomorphic encryption to provide system level integrity. Presently, when a computation platform is implemented to support high integrity computation, all computation on the platform is provided the benefit of high integrity fail-passivity. This includes data parsing, avionics computation, data load support, maintenance update data, and so on. Some of this data computation needs high integrity computation, and some does not. In fact a significant portion of the functional logic does not. Additionally, only a small subset of the values computed requires high integrity support.

When using the homomorphic encryption and single-string computation processors to support avionics functions, in accordance with the present invention, only those portions of the computational algorithm requiring high integrity need to be burdened with the effort required to do so. This is part of the software algorithmic design process.

Therefore, while homomorphic encryption based mathematic operations may be more CPU intensive than traditional forms of open mathematical computation, only a small number of the data values need be computed using this form. For example, if 10% of the computation we increased by 100% then 110% total of the original computation would be needed. However, if a single processor can perform the same function that is currently supported by two processors with dual cross comparator ASIC devices, this represents a significant savings in both cost, complexity, and program risk.

Encryption Mechanism Complexity Threshold

When selecting the encryption algorithm used, the motivation for homomorphic encryption should also be considered specifically in the area of avionics.

Computational Integrity: When the motivation is to support computation integrity, the encryption complexity should be sufficient so that it can be argued that no single platform random fault would allow the platform to become capable of persistently computing invalid mathematical values. This is a much lower threshold than typical encryption strategies motivated by the need to prevent highly sophisticated hackers from breaking security.

While a simple bit-wise-NOT form of encryption may not be enough (as the processor has a NOT function built in), a somewhat more complicated encryption form may be acceptable. This lower threshold can provide avionics specific approaches to homomorphic encryption that are very efficient, while meeting the requirement that no single platform random fault can compromise integrity.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.), etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Other embodiments and configurations may be devised without departing from the spirit of the invention and the scope of the appended claims.

The invention claimed is:

1. An avionics system, comprising:
a) a plurality of receivers, at least one of the receivers comprising an avionics device;
b) a plurality of transmitters, at least one of the transmitters comprising one or more sensors, each transmitter of the plurality of transmitters configured to:
collect a first input data value and at least one additional input data value with the one or more sensors;
generate multiple member values that form a n-tuple of each input data value, wherein n is greater than 2, and
c) a plurality of homomorphic encryption based high integrity computing systems, each homomorphic encryption based high integrity computing system, comprising:
a processing system configured to receive, from the plurality of transmitters, the multiple member values that form the n-tuple of each input data value, said processing system comprising one or more processors hosting at least one hosted function, said one or more processors configured to provide high integrity homomorphic encryption based isolated channel computations thereon repeating computations of the hosted function once for each of the respective multiple member values of each input data value,
wherein said plurality of homomorphic encryption based high integrity computing systems, said plurality of said receivers, and said plurality of said transmitters are operatively interconnected to form the avionics system,
wherein the processing system provides high integrity computation by validating computational integrity either at a transmitter of the processing system or a receiver of the plurality of receivers by isolated channel computations, wherein the n-tuple of the first input data value consists of n values of a single numeric value A, $E_{K1}A$, $E_{K2}A$, ..., and $E_{Kn-1}A$, wherein A is a single numeric value A collected by a single sensor of the one or more sensors, wherein $E_{K1}A$ is an encrypted value of A using key K1, $E_{K2}A$ is an encrypted value of A using key K2, ..., and $E_{Kn-1}A$ is an encrypted value of A using key Kn−1, wherein keys K1, K2, ..., and Kn−1 are encryption keys, wherein the n-tuple of the at least one additional input data value consists of n values of a single numeric value B, $E_{K1}B$, $E_{K2}B$, ..., and $E_{Kn-1}B$, wherein B is a single numeric value collected by a different sensor of the one or more sensors, wherein $E_{K1}B$ is an encrypted value of B using the key K1, $E_{K2}B$ is an encrypted value of B using the key K2, ..., and $E_{Kn-1}B$ is an encrypted value of B using the key Kn−1, wherein the hosted function of the processing system is further configured to compute a value C by performing a homomorphic operation OP on the first input data value A and the at least one additional data value B, wherein computing C includes computing C=A OP B, wherein the hosted function of the processing system is further configured to compute encrypted values of C: $E_{K1}C=E_{K1}A$ OP $E_{K1}B$, $E_{K2}C=E_{K2}A$ OP $E_{K2}B$, ..., and $E_{Kn-1}C=E_{Kn-1}A$ OP $E_{Kn-1}B$, and wherein the hosted function of the processing system is further configured to verify that decrypting each of $E_{K1}C$, $E_{K2}C$, ..., and $E_{Kn-1}C$ using the keys K1, K2, ... and Kn−1 respectively, yields a same value as the computed value C, wherein $E_{K1}C$, $E_{K2}C$, and $E_{Kn-1}C$ are the encrypted values of C calculated using the homomorphic operation OP, and wherein, upon determining the decrypted values all represent the same computed value C, the one or more processors are configured to adjust one or more characteristics of the avionics system based upon the computed value C.

2. The avionics system of claim 1, wherein the validating computational integrity of each computed value is performed by executing a same set of operations on each of the n values of the n-tuple of a first input data value and a second input data value to ensure any computed values represent a similar computed value after any computed value which was encrypted has been decrypted.

3. The avionics system of claim 2, wherein the same set of operations include mathematical operations.

4. The avionics system of claim 2, wherein the same set of operations include addition, subtraction, multiplication, division, reciprocal, root and transcendental operations.

5. A homomorphic encryption based high integrity computing system, comprising:
a receiver;
a transmitter, the transmitter including one or more sensors, the transmitter configured to:
  collect a first input data value and at least one additional input data value; and
  generate multiple member values that form a n-tuple of each input data value, wherein n is greater than 2; and
a processing system configured to receive, from the transmitter, the multiple member values that form the n-tuple of each input data value, said processing system comprising one or more processors hosting at least one hosted function, said one or more processors configured to provide high integrity homomorphic encryption based isolated channel computations thereon repeating computations of the hosted function once for each of the multiple member values of each input data value, wherein the processing system provides high integrity computation by validating computational integrity either at a transmitter of the processing system or the receiver by isolated channel computations, wherein the n-tuple of the first input data value consists of n values of a single numeric value A, $E_{K1}A$, $E_{K2}A$, ..., and $E_{Kn-1}A$, wherein A is a single numeric value A collected by a single sensor of the one or more sensors, wherein $E_{K1}A$ is an encrypted value of A using key K1, $E_{K2}A$ is an encrypted value of A using key K2, ..., and $E_{Kn-1}A$ is an encrypted value of A using key Kn−1, wherein keys K1, K2, ..., and Kn−1 are encryption keys, wherein the n-tuple of the at least one additional input data value consists of n values of a single numeric value B, $E_{K1}B$, $E_{K2}B$, ..., and $E_{Kn-1}B$, wherein B is a single numeric value collected by a different sensor of the one or more sensors, wherein $E_{K1}B$ is an encrypted value of B using the key K1, $E_{K2}B$ is an encrypted value of B using the key K2, ..., and $E_{Kn-1}B$ is an encrypted value of B using the key Kn−1, wherein the hosted function of the processing system is further configured to compute a value C by performing a homomorphic operation OP on the first input data value A and the at least one additional data value B, wherein computing C includes computing C=A OP B, wherein the hosted function of the processing system is further configured to compute encrypted values of C: $E_{K1}C=E_{K1}A$ OP $E_{K1}B$, $E_{K2}C=E_{K2}A$ OP $E_{K2}B$, ..., and $E_{Kn-1}C=E_{Kn-1}A$ OP $E_{Kn-1}B$, and wherein the hosted function of the processing system is further configured to verify that decrypting each of $E_{K1}C$, $E_{K2}C$, ..., and $E_{Kn-1}C$ using the keys K1, K2, ... and Kn−1 respectively, yields a same value as the computed value C, wherein $E_{K1}C$, $E_{K2}C$, and $E_{Kn-1}C$ are the encrypted values of C calculated using the homomorphic operation OP, and wherein, upon determining the decrypted values all represent the same computed value C, the one or more processors are configured to adjust one or more characteristics of an avionics system based upon the computed value C.

6. The system of claim 5, wherein the validation of computational integrity of each computed value is performed by executing a same set of operations on each of the n values of the n-tuple of the first input data value and the second input data value to ensure any computed values represent a similar computed value after any computed value which was encrypted has been decrypted.

7. The system of claim 5, wherein the same set of operations include mathematical operations.

8. The system of claim 5, wherein the same set of operations include addition, subtraction, multiplication, division, reciprocal, root and transcendental operations.

* * * * *